US007949050B2

(12) United States Patent
Xu et al.

(10) Patent No.: US 7,949,050 B2
(45) Date of Patent: May 24, 2011

(54) METHOD AND SYSTEM FOR SEMANTICALLY SEGMENTING SCENES OF A VIDEO SEQUENCE

(75) Inventors: Li-Qun Xu, Ipswich (GB); Sergio Benini, Verona (IT)

(73) Assignee: British Telecommunications public limited company, London (GB)

( * ) Notice: Subject to any disclaimer, the term of this patent is extended or adjusted under 35 U.S.C. 154(b) by 1171 days.

(21) Appl. No.: 10/592,755

(22) PCT Filed: Mar. 17, 2005

(86) PCT No.: PCT/GB2005/001006
§ 371 (c)(1),
(2), (4) Date: Sep. 14, 2006

(87) PCT Pub. No.: WO2005/093638
PCT Pub. Date: Oct. 6, 2005

(65) Prior Publication Data
US 2007/0201558 A1 Aug. 30, 2007

(30) Foreign Application Priority Data

Mar. 23, 2004 (GB) .................................. 0406512.4

(51) Int. Cl.
H04B 1/66 (2006.01)
H04N 5/14 (2006.01)
(52) U.S. Cl. .................................. 375/240.22; 348/700
(58) Field of Classification Search .............. 375/240.01
See application file for complete search history.

(56) References Cited

U.S. PATENT DOCUMENTS

| 4,815,134 | A | * | 3/1989 | Picone et al. ................. 704/222 |
| 5,930,749 | A | | 7/1999 | Maes |
| 6,009,392 | A | * | 12/1999 | Kanevsky et al. ............ 704/245 |
| 6,195,458 | B1 | | 2/2001 | Warnick et al. |
| 2002/0181711 | A1 | * | 12/2002 | Logan et al. ...................... 381/1 |
| 2002/0194591 | A1 | * | 12/2002 | Gargi ............................. 725/32 |
| 2003/0233628 | A1 | * | 12/2003 | Rana et al. ...................... 716/18 |

FOREIGN PATENT DOCUMENTS

| EP | 0938054 A2 | 8/1999 |
| EP | 1081960 A1 | 3/2001 |

OTHER PUBLICATIONS

International Search Report dated May 18, 2005.
GB Search Report dated Jul. 30, 2004.
Rui et al., "Constructing Table-of-Content for Videos", Multimedia Systems, Association for Computing Machinery, New York, US, vol. 7, No. 5, Sep. 1999, pp. 359-368, XP001172446.

(Continued)

Primary Examiner — Andy S. Rao
Assistant Examiner — Hee-Yong Kim
(74) Attorney, Agent, or Firm — Nixon & Vanderhye P.C.

(57) ABSTRACT

A shot-based video content analysis method and system is described for providing automatic recognition of logical story units (LSUs). The method employs vector quantization (VQ) to represent the visual content of a shot, following which a shot clustering algorithm is employed together with automatic determination of merging and splitting events. The method provides an automated way of performing the time-consuming and laborious process of organising and indexing increasingly large video databases such that they can be easily browsed and searched using natural query structures.

21 Claims, 9 Drawing Sheets

OTHER PUBLICATIONS

Zong et al., "Society of Photo-Optical Instrumentation Engineers (SPIE): "Clustering Methods for Video Browsing and Annotation, Storage and Retrieval for Still Image and Video Databases 4, San Jose, Feb. 1-2, 1996, Proceedings of SPIE, Bellingham, SPIE, US., vol. 2670, Feb. 1, 1996, pp. 239-246.

Gomes et al., "Vector Quantization-Based Automatic Shot Boundary Detection", Proceedings of the 2003 IEEE Radar Conference, Huntsville, AL, May 5-8, 2003, IEEE Radar Conference, New York, NY,: IEEE, US, Dec. 9, 2002, pp. 216-219, XP010642550.

Rasheed et al., "A Graph Theoretic Approach for Scene Detection in Produced Videos", Proc. WS on Multimedia Information Retrieval, Aug. 1, 2003, pp. 1-6, XP002328345.

Liu et al., "Audio Feature Extraction and Analysis for Scene Segmentation and Classification", Journal of VLSI Signal Processing Systems for Signal, Image, and Video Technology, Kluwer Academic Publishers, Dordrecht, NL, vol. 20, No. ½, Oct. 1998, pp. 61-78, XP000786728.

Cheng et al., "Variance Oriented Dynamic Codebook Adapative Vector Quantization System for Image Coding", Global Telecommunications Conference 1995. Conference Record, Communication Theory Mini-Conference, Globecom '95, IEEE Singapore Nov. 13-17, 1995, New York, NY, IEEE, US, vol. 1, Nov. 13, 1995, pp. 473-477.

Logan et al., "A Music Similarity Function Based on Signal Analysis", Multimedia and Expo, 2001, ICME 2001, IEEE International Conference on Aug. 22-25, 2001, Piscataway, NJ, USA, IEEE, Aug. 22, 2001, pp. 745-748, XP 10661946.

Haibin Lu, Yujin Zhang and Weiping Yang, "Shot and Episode Based Nonlinear Organisation of Video," Chinese J. Computers, vol. 23, No. 5, May 2000 with English Abstract.

* cited by examiner

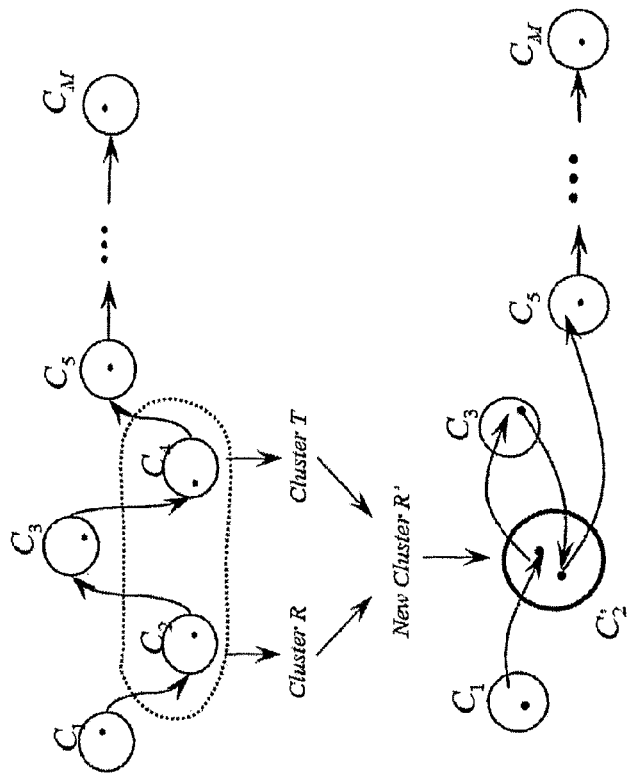
Figure 7
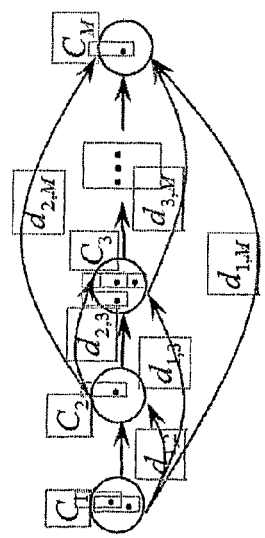
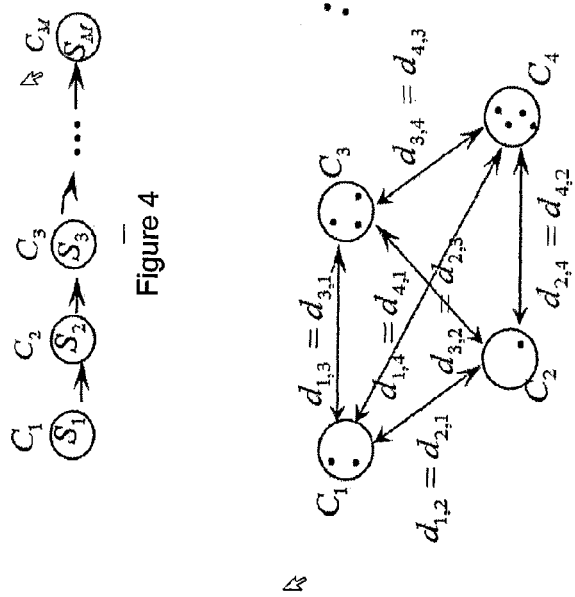
Figure 4
Figure 5
Figure 6

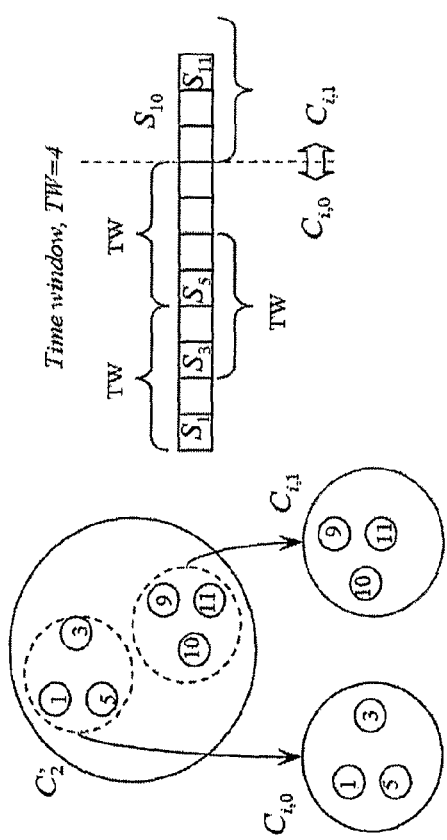
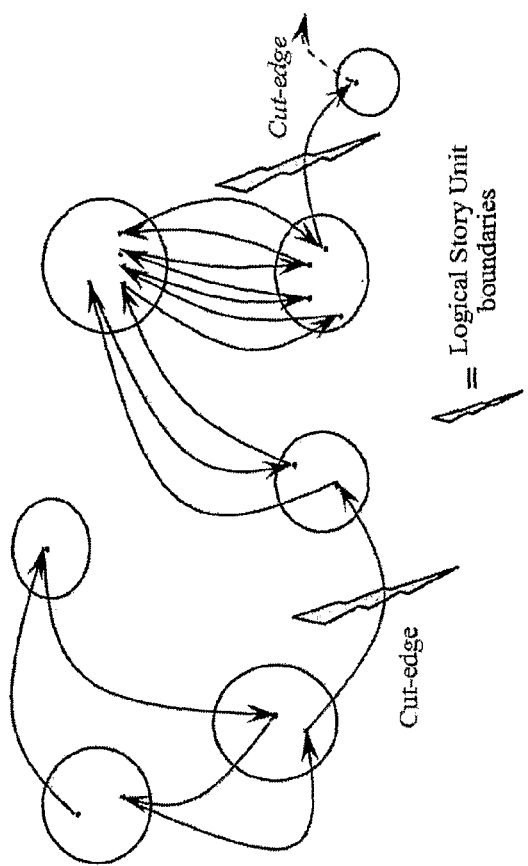
Figure 10
Figure 11

METHOD AND SYSTEM FOR SEMANTICALLY SEGMENTING SCENES OF A VIDEO SEQUENCE

This application is the US national phase of international application PCT/GB2005/001006 filed 17 Mar. 2005 which designated the U.S. and claims benefit of GB 0406512.4, dated 23 Mar. 2004, the entire content of which is hereby incorporated by reference.

TECHNICAL FIELD

Example embodiments of the present invention relates to a video content analysis and segmentation method and system which allows for segmentation of video scenes at the semantic level.

BACKGROUND TO EXAMPLE EMBODIMENTS OF THE INVENTION

Akin to textual documents, multimedia documents, and especially audio-visual oriented video contents, have both syntacetic and semantic structures. In the latter, the meaning of semantic content, often referred to as scenes, episodes, story-lines, and, on a finer-level, events, is high-level knowledge conveyed by a video programme (comparable with that of sections and paragraphs in a textual document) which is in contrast with the low-level content description units of shots and frames (equivalent to sentences, words and alphabets in a textual document). With the advent of the digital era and the ubiquity of faster Internet connections, digital video content for both professional and domestic consumer environments is available at an ever increasing pace. However, these huge, mostly unstructured digital archives make it difficult, if not impossible, to access and search for any desired information without time-consuming and laborious effort. The assistance from any automatic image and multimedia handling tools for analysing, indexing and retrieving these documents would therefore be most welcome. This is especially true if the tools can interpret the semantic meaning of each document in addition to analysis at the syntacetic level. Such tools would greatly help the content management industry sector, from content production and processing, to asset reuse, synthesis, and personalised delivery.

For further background, various concepts regarding the hierarchical organisation of a video structure are described below, including a summary of the definitions used herein, and in the art, regarding, for example, computable 'logical story units' and video editing techniques.

A number of references are listed at the end of the description and are referred to in the description by means of numerals appearing in square brackets.

The hierarchical model of a movie structure can usually be organised on a three-level basis, comprising (from low to high level) the shot level, event level, and episode (or scene) level.

A shot is a segment of audio-visual data filmed in a single camera take. Most multimedia content analysis tasks start with the decomposition of the entire video into elementary shots, which is necessary for the extraction of audio-visual content descriptors.

An event is the smallest semantic unit of a movie. It can be a dialogue, an action scene or, in general, a set of contiguous shots which share location and time. It may happen that more events just alternate between themselves to carry on more events taking place in parallel.

An episode (or scene) is normally defined to be a sequence of shots that share a common semantic thread and can contain one or more events.

Commonly, episode boundary detection is performed using only automatically detected low-level features without any prior knowledge. It is often the case, therefore, that the detected scene boundaries do not correspond precisely to those of an actual scene. To address this issue, researchers have introduced the so-called computable scene [6], or logical story unit (LSU) [1], which reveal the best approximation to real movie episodes. Compared to actual scenes that are defined by their semantic contents, LSUs are defined in terms of specific spatio-temporal features which are characteristic of the scene under analysis.

Assuming that an event is related to a specific location (called 'scenery') occurring within a defined time interval in which certain movie characters are present, we can state that in general a scene can be characterised by global temporal consistency in its visual content. A definition of Logical Story Unit (LSU), taken from [1], is therefore:

"a series of temporally contiguous shots characterised by overlapping links that connect shots with similar visual content elements."

Turning now to movie editing techniques, we discuss below techniques that are useful for discussion of example embodiments of the present invention. Reference provides a more thorough analysis of certain common conventions and techniques used in audio-visual media creation. In this reference, the focus is on different types of shots and scenes, and various uses of them in different contexts of a movie.

A shot can either be part of an event or serve for its 'description' [1]. This means that a shot can show a particular aspect of an event which is taking place (such as a human face during dialogue) or can show the scenery where the succeeding event takes place. In the following, these two kinds of shots are respectively referred to as 'event' shots and 'descriptive' shots.

Usually, the presence of a 'descriptive' shot, at the beginning of an episode, works as an introduction to the scenery for the following 'event' shots. For example, in the popular comedy film "Notting Hill" we see many times a shot showing a bookshop from the outside, while the succeeding shots elaborate on what is happening inside the bookshop. It is clear that the episode comprises all the shots (the one outside the shop and those inside) but automated analysis may result in the first shot not being included as part of the bookshop LSU. In this case, the LSU boundaries do not correspond exactly to the actual scene boundaries, but provide the best possible approximation.

With respect to scenes, these are normally classified into two main categories [6] namely:

N-type: these scenes (normal scenes) are characterised by a long-term consistency of chromatic composition, lighting condition and sound; and M-type: these scenes (montage scenes) are characterised by widely different visual contents (e.g., different location, timing, lighting condition, characters, etc.) and often with long-term consistency in the audio content.

Many post-production video programme genres such as movies, documentaries, sitcoms etc. have underlying story-lines and semantic structures in addition to their syntacetic compositions. Automatic detection of these logical video segments can lead to interactive and personalised multimedia delivery and consumption by end users in an age of broadband connections or any other fast network media access. As a consequence of these potential benefits, research has been conducted into such automatic detection techniques, as outlined below.

PRIOR ART

Over recent years, there has been substantial research and development activities in the fields of structuring, indexing and retrieving from video databases (of various genera) at the semantic-level, in attempts to bridge a perceived "semantic gap" between low-level audio-visual features (e.g., colours, textures, motions etc) and the high-level semantic meaning. For example, in [2], an approach based on time-constrained clustering is presented. Interesting results are obtained, measuring visual similarity between shots by means of colour or pixel correlation between key frames, followed by applying predefined memory models for recognising patterns inside the story. However, in this case, the choice of a predefined interval (in frames) puts an artificial limit on the duration of an episode.

Another interesting approach is discussed in [3] where LSUs are detected by means of linking shot concepts, the dissimilarity between shots being examined using block matching between frames at a pre-set frame interval.

Also, there has been increasing research interest into using audio information [5] and mixed audio-visual information to detect scene boundaries [6,7,8]. However, how to combine audio and visual information efficiently remains a difficult issue, as there exist seemingly many different relationships between the two due to the video genre variety and styles of content production. In [6] the authors use a finite memory model to segment the audio and video data into respective scenes, and have then applied sliding windows to merge audio and video scene results. In [7] an audio assisted scene segmentation technique is proposed that uses audio information to remove false boundaries generated from visual scene segmentation. Other authors [8] focus first on object tracking methods for visual segmentation, then analyse audio features based on the detected video shots, without concern as to what the content of the audio data actually is.

Example embodiments of the present invention aim to provide a further video segmentation technique in addition to those described above.

SUMMARY OF EXAMPLE EMBODIMENTS OF THE INVENTION

According to example embodiments of the invention, there is provided a method of identifying semantically similar shots in a video sequence, comprising the steps of: a) identifying shots within the video sequence, each shot being a temporally consecutive sequence of video frames; b) calculating distance values between each shot and every other shot; and c) clustering shots into groups in dependence on the respective calculated distance values therebetween; wherein the shots clustered into a group at step c) have semantically similar content.

According to a second aspect of example embodiments of the invention, there is provided a method of automatically organising video shots of a video sequence into groups having similar semantic content, the method comprising the steps of: a) identifying shots within the video sequence, each shot comprising a consecutive sequence of video frames; b) generating a codebook representation of each shot using a quantization procedure; c) calculating distance values between each shot and every other shot in dependence on the respective codebook representations thereof; and d) clustering shots into groups in dependence on the respective calculated distance values therebetween.

In a preferred embodiment, there is introduced a novel shot-based video content analysis approach, aimed at automatic recognition of (LSUs), detection of scene changes, similar (repeated) scene and/or events along the video sequence. The approach includes: vector quantisation (VQ)-based visual content representation of a shot, an efficient shot clustering algorithm with automatic determination of merging and splitting, time-constrained analysis within a shot cluster, use of a scene transition graph for scene detection, VQ-based audio content representation of a shot, audio characteristic change detection, and the fusion of audio and visual analysis results through heuristic rules. The aim is to automate the time-consuming and laborious process of organising and indexing increasingly large video databases such that they can be easily browsed, searched using natural query structures that are close to human concepts.

BRIEF DESCRIPTION OF THE DRAWINGS

FIG. 4 is a diagram illustrating a sequence of shots as an original shot graph (OSG);

FIG. 5 is a diagram illustrating distances between clusters of shots, called VQ distance graph;

FIG. 6 is a diagram illustrating distances between clusters of shots;

FIG. 7 is a diagram illustrating an example of clustering of shots for the first iteration;

FIG. 10 is a diagram illustrating the time-constrained sub-clustering of shots;

FIG. 11 is an example of the use of scene transition graph;

DESCRIPTION OF AN EMBODIMENT

Figure 1A:
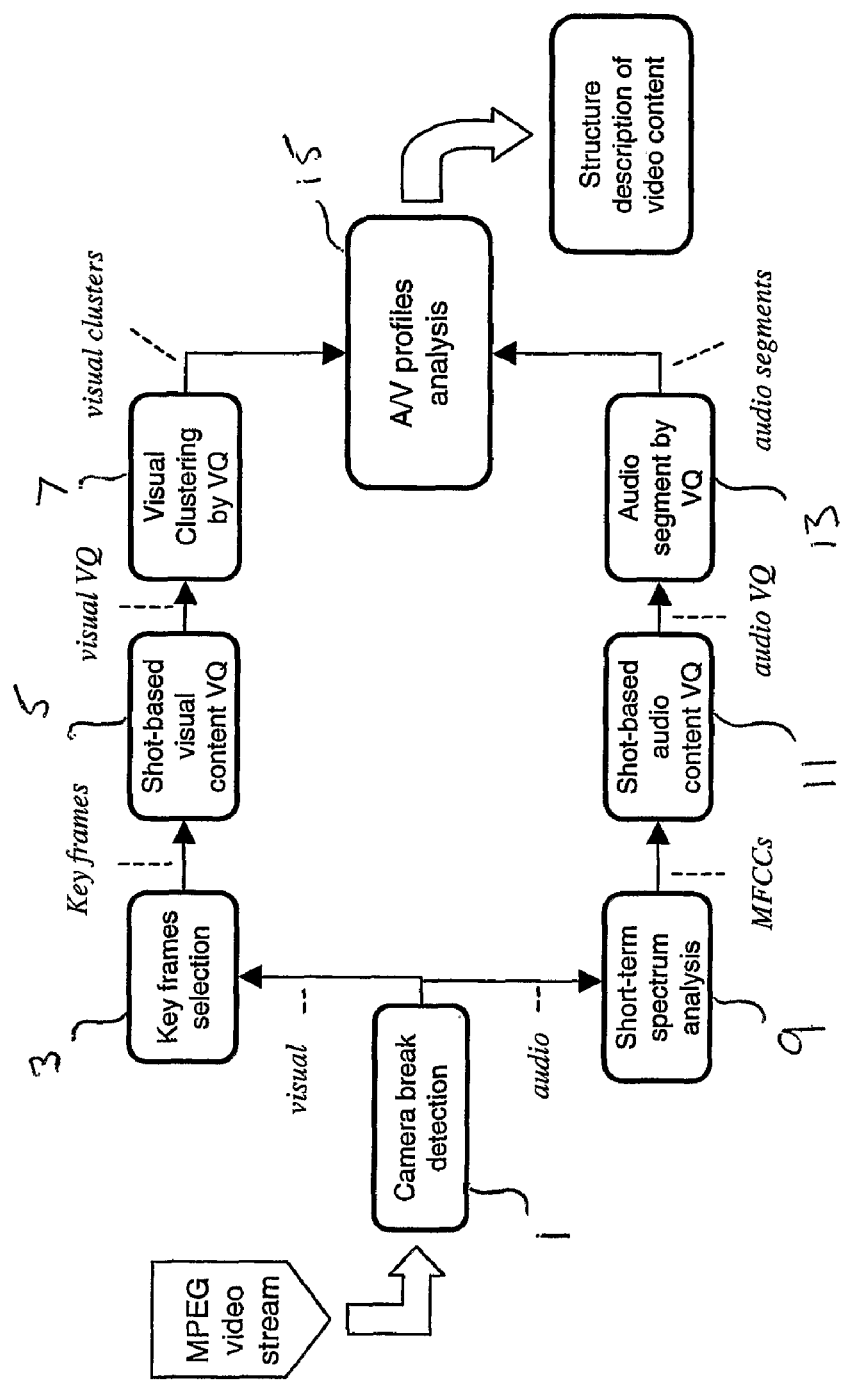
FIG. 1(a) is a block diagram of a system architecture of an embodiment of the invention.

An embodiment of the invention will now be described with reference to the accompanying drawings. More particularly, an overview of the architecture and operating process of the semantic video analysis system, as provided by the embodiment of the invention, will first be described with reference to FIGS. 1(a) and 1(b). A more detailed examination of each step will then be described.

Overview of Operation

The method and system of embodiments of the invention are intended to operate on a video sequence such as provided by an MPEG video stream or the like. It should be noted, however, that the embodiments are not concerned with decoding any encoded video sequence, whether the encoding be MPEG or otherwise. It is assumed that input to the embodiments of the invention is in the form of decoded video data.

The method and system is, in this embodiment, implemented by way of a computer program arranged to be executed under the control of a processor, such as a personal computer. The computer program may be made available on a portable storage medium, such as a floppy or compact disk, where it may thereafter be stored and/or executed on the computer.

In a first step 1, the entire video stream is first broken up into elementary camera shots using a known automated method. Techniques for decomposing the video sequence into individual shots are known in the art, such as those described in L-Q. Xu, J. Zhu, and F. W. M. Stentiford, "Video summarisation and semantic editing tools," in *Storage and Retrieval for Media Databases, Proc. of SPIE*, Vol. 4315, San Jose, USA, 21-26 Jan. 2001. The contents of this document are incorporated herein by reference. In a subsequent step 3, for each elementary shot, one or more keyframes are extracted to represent that shot's visual content by way of some characteristic 'signature'. In this case, the signature is provided by a vector quantisation (VQ) codebook which is generated in a subsequent step 7. The VQ codebook is derived from low-level visual features (e.g., colours, textures etc).

Shot keyframe selection is known in the art, as described in Y. Zhuang, Y. Rui, T. Huang, S. Mehrotra, "Adaptive key frame extraction using unsupervised clustering," in *Proc. of IEEE Int'l Conf. on Image Processing*, pp. 866-870, Chicago, October 1998. Vector quantisation codebook techniques are also known in the art, as described in R. M. Gray, "Vector quantization," *IEEE ASSP Magazine*, Vol. 1, pp. 4-29, April 1984.

In parallel with the above-mentioned decomposition of the video sequence, an audio shot can also be defined. The length of the audio shot is normally selected so as to correspond to the length of a visual shot, but it can be a concatenation of a few adjacent visual shots if the visual shot is too short. In an initial stage 9, each audio shot is characterised by short-term spectral characteristics, such as Mel-Frequency Cepstrum Coefficients (MFCCs). The audio shot's content 'signature', which can also comprise a VQ codebook, is then computed in a subsequent stage 11 on the basis of the aggregated short-term audio characteristics over the entire shot, as described later.

Returning to the video decomposition process, following keyframe characterisation in step 5, visual clustering of shots is performed in a subsequent step 7 based on the VQ codebooks. Here, the aim is to perform a global grouping of all shots of the video stream into a number of so-called clusters based on the similarity of their visual content signatures, i.e. the VQ codebooks. Initially, each cluster contains a single shot. A clustering algorithm employing a well-defined distance metric is used, which algorithm also has error correction capabilities if two clusters are similar enough (in terms of having minimal distance between them) to allow merging. This will lead to a final set of clusters that share similar visual appearances (in terms of their 'look and feel') and that are determined automatically without requiring prior knowledge of the content or artificial human setting. The visual clusters are output to an audio-visual (A/V) profile analysis stage 15.

In the audio decomposition process, segmentation of the accompanying audio stream is performed in stage 13 using a similar vector quantisation technique to that applied to the video stream. As will be outlined in more detail later, the dissimilarity between audio content signatures for consecutive shots is computed using the well-known Earth Mover's Distance (EMD) metric. The EMD metric gives a global view of the changes in audio content in the time domain. A thresholding operation, based on statistical analysis of the distance metrics, is then applied to detect local peaks that are above a certain threshold. The shots falling within two peaks are identified as sharing similar audio properties, and hence are arranged to be segmented together.

Figure 1B:
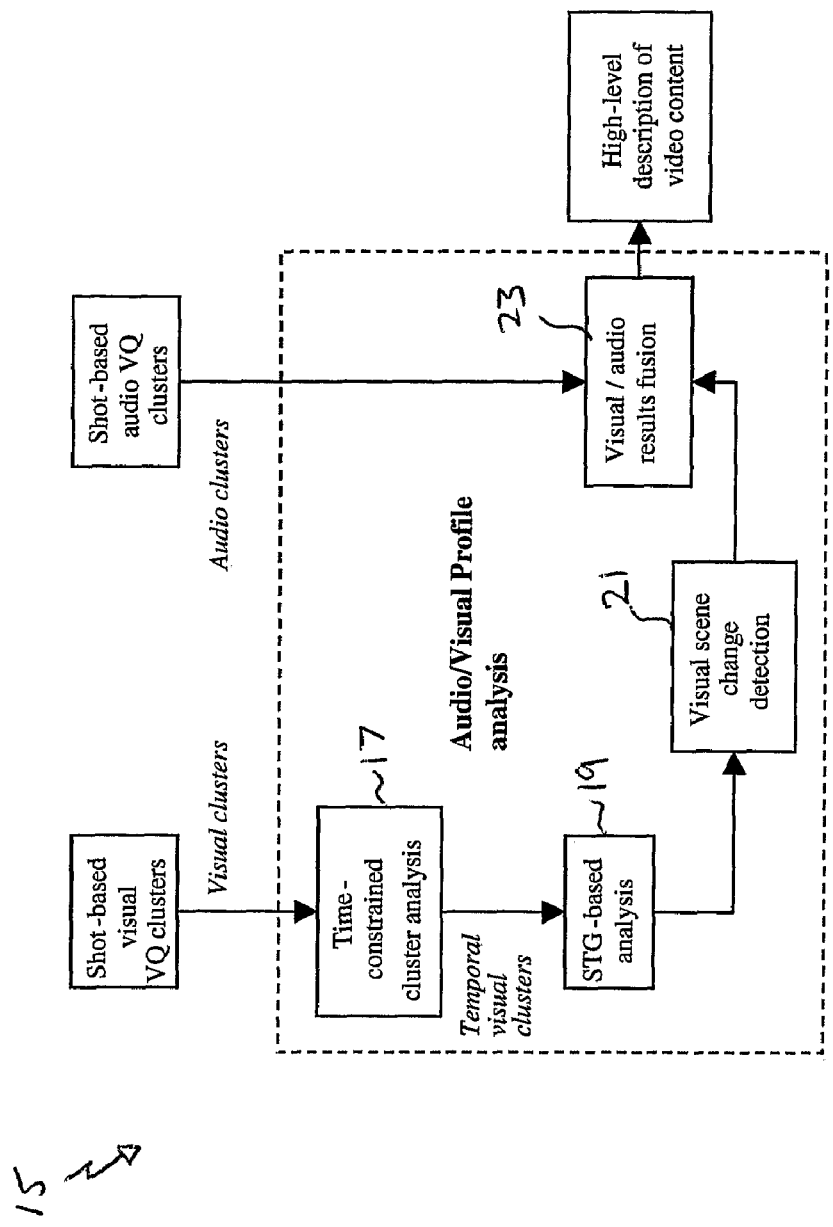
FIG. 1(b) is a block diagram of part of the system architecture shown in FIG. 1(a)

Referring now to FIG. 1(b), which is a detailed block diagram of the A/V profile analysis stage 15, time-constrained cluster analysis 17 is performed on the received video clusters. In the previous stage 7, each shot within a cluster is time-stamped. In order to distinguish visually similar scenes that occur at different times/stage of a programme, e.g. scenes having been captured in a similar physical setting, such as a particular pub, flat etc., the time-constrained cluster analysis stage 17 is arranged to perform the task of checking temporal consistency of the scene using a sliding window technique. As a result, a number of clusters are generated in which the shots are not only similar to each other in terms of appearance, but are also adjacent in time. There is also generated a graphical representation describing the temporal relationship between these clusters.

In a subsequent step 17, so-called Scene Transition Graph (STG)-based analysis is performed. Given the set of shot clusters mentioned above, using the concept of scene transition graphs (STGs), graphical analysis is performed to derive the final semantic scenes by associating a weaker cluster A with the same semantic label of a second cluster B. Although cluster A may be visually different from cluster B, it is nevertheless temporally sandwiched between the shots belonging to B. The STG-based analysis step 19 then detects the "cut edges" of the transition graph for semantically distinct video segments.

The output of the STG-based analysis step 19 provides useful information as to the semantic structure of the video sequence at the scene level rather than merely at the shot level, and can be used in several ways. In particular, a subsequent automatic scene change detection step 21 provides a first step towards greater semantic understanding of a video sequence, such as a movie, since breaking the movie up into scenes assists in creating content summaries, which in turn can be exploited to enable non-linear navigation inside the movie. Furthermore, the determination of visual-structure within each scene helps the process of visualising each scene in the film summary.

The visual clustering stage 7 can itself provide useful information, even without the subsequent time-constrained analysis stage 17. This is because the visual clustering stage 7 groups all shots, having similar semantic content, together in the same cluster. This can then be used to show a user all shots relating to the semantic content in a convenient manner. For example, a user could ask to view every shot in a video sequence that was taken at a particular location. The visual clustering can then be used to cluster together all shots taken at said location in an automatic manner, for identification and subsequent display to the user.

Finally, in a further stage 23, where both video and audio segmentation is provided, fusion of the video and audio results can be performed. This stage 23 takes, as input, the outcome of the two above-described groupings of steps and generates three different explanations of audio-visual scene changes based on a set of heuristic rules.

The processing involved in the above steps will now be described in more detail.

Visual Information Processing

The steps involved in processing the video information will be described first with particular reference to FIGS. 2 to 11. Although not essential for understanding the invention, It is assumed that the skilled reader is aware of known techniques for performing the camera break detection and key frame detection stages 1, 3. In any case, a full description is given in the references mentioned above.

VQ Codebook and the Inter-VQ Distortion Metric

Figure 2A:
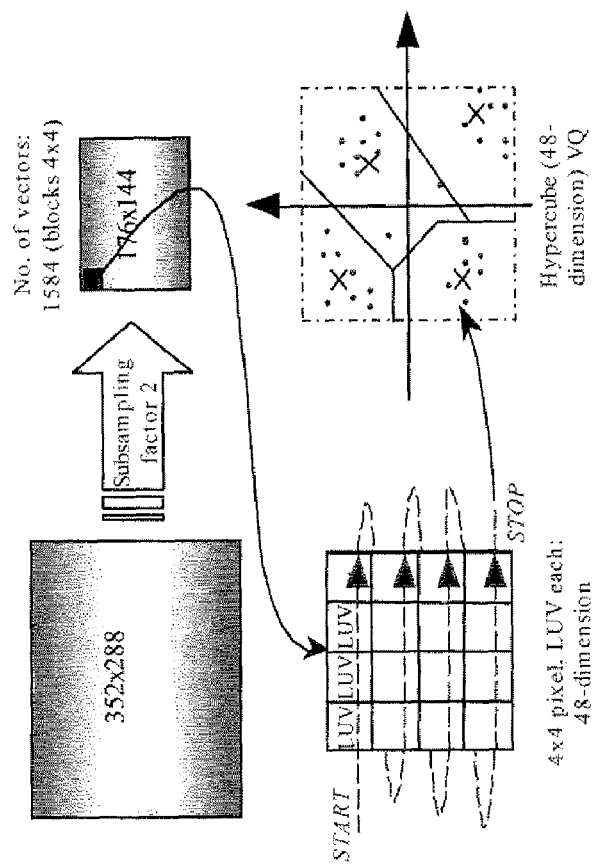
FIGS. 2(a)-(c) are diagrams illustrating vector quantisation (VQ) codebook generation.

In the key-frame characterisation stage 5, key-frames corresponding to each shot are received and analysed. Referring to FIG. 2(a), for each shot, the selected key-frame is decoded as a still 352×288 image in LUV format. Next, each key-frame is sub-sampled by a factor of 2, and the image is subdivided into blocks of 4×4 pixels. Since the sub-sampled image will have a display format of 176×144, it will be appreciated that 1584 4'4 pixel blocks will be present. These pixel blocks serve as input vectors (or a 'training set') to a vector quantiser for generation of a suitable codebook which is used to characterise the particular key-frame.

Figure 2B:
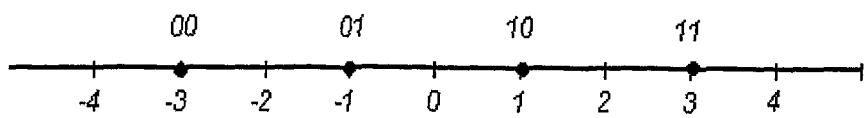
Figure 2C:
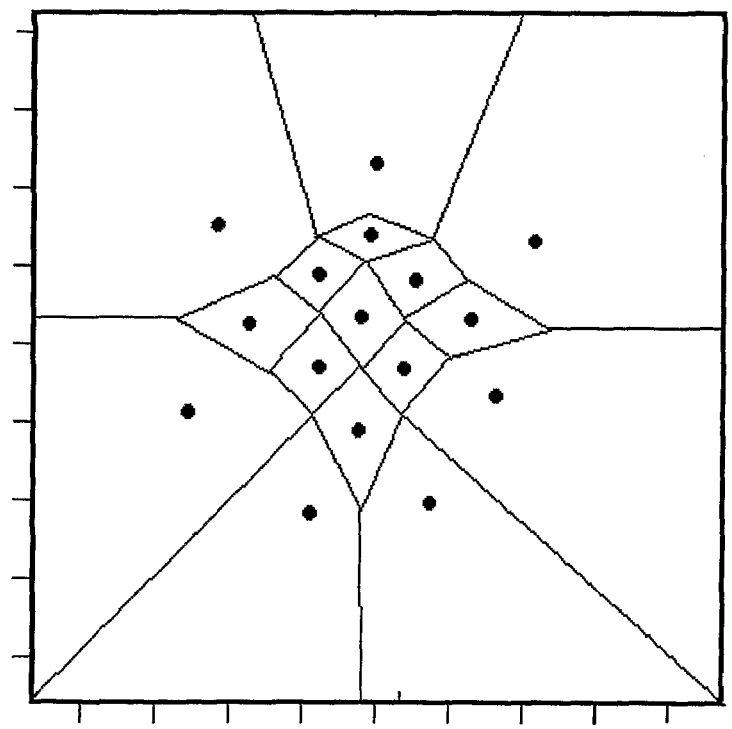

Vector quantisation (hereafter referred to as VQ) is well known in the art of video processing. A full discussion of the background and uses of VQ is provided in the above-mentioned reference by R. M. Gray in IEEE ASSP Magazine. In brief, VQ is a lossy data compression method based on the principle of block coding. It is a fixed-to-fixed length algorithm that acts as an approximator. Referring to FIG. 2(b) an example of a one dimensional vector quantiser is shown. Here, every number less that −2 is approximated by −3, every number between −2 and 0 is approximated by −1, every number between 0 and 2 is approximated by +1 and so on. The approximate values are uniquely represented by two bits. This type of vector quantiser is called a 1-dimensional 2-bit vector quantiser having a rate of 2-bits per dimension. Referring to FIG. 2(c) an example of a two dimensional vector quantiser is shown. It will be seen that every pair of numbers falling in a particular region are approximated by single value indicated by a circle 25. In this case, there are 16 regions and 16 circles, each of which can be uniquely represented by 4-bits. Thus, FIG. 2(c) represents a 2-dimensional 4-bit vector quantiser having a rate of 2-bits per dimension. In the examples of FIGS. 2(b) and 2(c) the circles are called codewords and the regions are called encoding regions. The set of all codevectors is called a codebook.

In the present analysis technique, the VQ process involves substituting each input image block with a predefined block (chosen among the codebook vectors) so as to minimise a distortion measure. In this way, the entire image can be reconstructed using only blocks belonging to the codebook.

Generally speaking, an image is characterised by some homogeneous colour zones of different sizes, implying that the pixels belonging to the same block share some colour properties so that correlation inside one block is likely to be very high. The larger the block size, however, the less correlation there is likely to be between pixels inside the block. Moreover, in each image there is always the presence of dominant colours corresponding to particular combinations of colour components. This means that if we represent pixels in a three-dimensional colour space, certain zones will be denser, showing that there also exists a strong correlation among colour components. VQ naturally exploits information regarding the correlation between components of the vector to be quantised—this information would be lost if single components were quantised in the scalar mode.

For all pixels belonging to a particular 4×4 block, the three LUV components of each pixel are concatenated, from top-left to bottom-right, to form a 48-dimensional vector, as shown in FIG. 2. Each 48-dimensional vector constitutes one input to the VQ codebook generation process.

VQ Codebook Generation

The codebook to be generated for each visual shot contains C codewords, each of D dimensions. Thereafter, we call this VQ codebook the signature of the key-frame (and so the visual shot) to which it relates. The codebook comprises the following elements.

i) The C codewords, which are, respectively, the centroid value of each cluster in the final codebook. As indicated in FIG. 2, each 48-dimensional vector is applied to a vector quantiser and, depending on the region within which the vector lies, the centroid value is thereafter assigned to that vector. The C codewords are obtained as follows:

$$(\mu_1, \ldots, \mu_D)_c = \frac{\sum_{i=1}^{M_c} (p_1^i, \ldots, p_D^i)_c}{M_c}$$

where C represents the number of codewords (or clusters) in a codebook, e.g. C=100, whilst c denotes the $c^{th}$ codeword. $M_c$ is the number of 4×4 blocks falling within the partition of the codeword c, $p_k^i$ is the $k^{th}$ component of the $i^{th}$ D-dimensional vector, and D=48. The $i^{th}$ D-dimensional vector is noted as $p_1^i, \ldots, p_D^i$.

ii) Variances of the codewords, obtained with the formula:

$$(\sigma_1^2, \ldots, \sigma_D^2)_c = \frac{\sum_{i=1}^{M_c} [(\mu_1 - p_1^i)^2, \ldots, (\mu_D - p_D^i)^2]_c}{M_c}.$$

iii) Weights of the codewords, which account for the number of 4×4 blocks $M_c$ associated with each codeword c. Usually, a normalised weight between 0 and 1 is used, i.e.

$$\varpi_c = M_c \bigg/ \sum_{c=1}^{C} M_c.$$

Here, the denominator is the total number of training vectors. As mentioned above, $M_c$ is the number of vectors falling within the $c^{th}$ cluster.

Note that all codewords with no or only one associated blocks are discarded.

The VQ Codebook Distance Metric (VQCDM)

Figure 3:
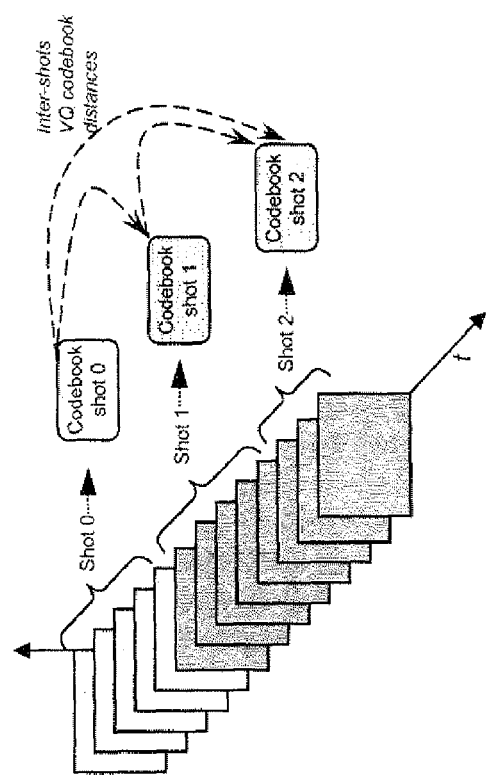
FIG. 3 is a diagram illustrating how VQ codebooks distances are generated between video shots.

As mentioned above, once the codebook for each video shot is obtained, a clustering algorithm employing a well-defined distance metric is used. Specifically, in this embodiment, a VQ codebook distance metric (VQCDM) is used. Referring to FIG. 3, the VQCDM between any two shots can be computed in two steps.

First, each codebook vector of the first shot $y_i \in \{y_1, \ldots, y_N\}$ is compared with that of the second shot $z_j \in \{z_1, \ldots, z_N\}$ to compute a distance matrix $d_{i,j} = d(y_i, z_j)$ according to the following expression:

$$d_{i,j} = \frac{1}{D} \sum_{h=1}^{D} [\alpha(\mu_{i_h} - \mu_{j_h})^2 + (1-\alpha)(\sigma_{i_h} - \sigma_{j_h})^2],$$

for $i = 1, \ldots, N$ and $j = 1, \ldots, N$ where D is the dimension of the codebook vectors, i represents the $i^{th}$ codeword in a codebook Y (for shot Y) and j represents the $j^{th}$ codeword in codebook Z (for shot Z). $\alpha$ is a weighting factor where $0<\alpha<1.0$. As will be appreciated, this generates a set of matrix indicating the relative distances between respective codebook vectors for each possible combination.

Second, given the result of the above expression, the VQCDM between two given shots Y and Z is defined as:

$$VQ_d(Y, Z) = \sum_{i=1}^{N} [\max(w_i, w_j) \cdot \min_{\{j\}}(d_{i,j})].$$

Since i is fixed, for all values of j we find the maximum value for the first term and the minimum value for the second term.

Note that the two codebooks being compared may have different valid sizes, i.e. the first shot's codebook has a size N and the second a size M where M≠N. This is not unusual since, as mentioned before, when some codebook vectors have no associated blocks they are simply discarded to reduce the codebook size.

Clustering Procedure

After the initial segmentation into individual shots, the grouping of video shots according to visual similarity gives the next hierarchical-level description of the video sequence. To achieve this grouping, in the next step 7, we use the VQ-based shot-level visual content descriptions, and the VQCDMs described above, in a clustering algorithm. Note that this scheme is neither related to the genre of a video, and nor does it need to have specific knowledge of the underlying story structure.

The clustering process assumes the presence of repetitive (or at least similar) shot structures along the sequence. This is a reasonable assumption for highly-structured programmes in a wide range of genres including feature movies, be they comedies and/or drama, situation-comedies and cartoons. The story-structure can be partially lost though, when, for example, the director uses a rapid succession of shots to highlight suspenseful moments or uses a series of shots merely to develop the plot of the movie. In this case, however, if dealing with N-scenes the clustering algorithm based on VQCDMs provides good performance, since shots belonging to the same scene usually share at least a similar chromatic composition, or environmental lighting condition, of the scene. The clustering procedure is split into two parts: a time-unconstrained procedure and a time-constrained procedure.

Time-Unconstrained Clustering Procedure

Initially, we assume there are M clusters $C_i \ldots C_M$, each representing a respective shot $S_i \ldots S_M$. Referring to FIG. 4, this situation is represented by a simple graph, called an Original Shot Graph (OSG) in which nodes correspond to the clusters (or shots) and edges/arrows indicate the transitions between clusters.

As described previously, the VCDM is computed for all shot combinations along the temporal axis so as to explore exhaustively the visual similarities within the entire video sequence. At each step, a cluster, together with the VQCDMs representing the distance of said cluster from all other clusters, is represented as a node on an updated graph, called a VQ distance graph. An example VQ distance graph is illustrated in FIG. 5. Referring to FIG. 5, the VQ distance graph contains 4 clusters $C_1 \ldots C_4$, some of which include more than one shot. For example, cluster $C_1$ includes two shots.

Since the VQCDMs for a pair of clusters are symmetric, for ease of explanation, FIG. 6 shows only one distance value for each pair.

At each iteration, the above-described procedure aims to merge a reference cluster R with its most visually similar test cluster T, wherein R<T in the sense of minimal VQCDM, thereby to form a new single cluster R' in place of R's position in the timeline. According to this merge operation, all shots belonging to reference cluster R and test cluster T become shots belonging to the new cluster R'. Furthermore, all transitions to/from R and T are updated in order to maintain the correct temporal flow of the story. FIG. 7 shows an example of a first merge operation (in which each cluster includes only one shot), the merge taking place between cluster $C_2'$ (i.e. the reference cluster R) and $C_4$ (i.e. the test cluster T).

For the resulting combined cluster R', a new VQ codebook is required to represent or characterise its visual content. The same process described above is employed to generate the codebook, although there is a difference in that the keyframes of all shots belonging to R' will be used for the codebook generation. Finally, the VQCDMs between the cluster R' and all the other clusters are calculated in preparation for the next step.

On-Line Statistical Analysis on Clustering Errors

Figure 8:
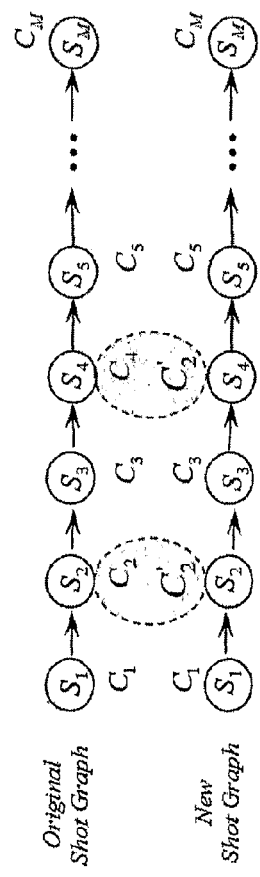
FIG. 8 is a diagram illustrating the replacement of the two clusters ($C_2, C_4$) by a new cluster $C_2'$.

Prior to commencing the next clustering iteration, a check is performed to determine whether the above-mentioned clustering operation should, in fact, have been performed. In particular, when a new cluster R' is formed, a VQ error is introduced into the Shot Graph with respect to the Original Shot Graph (OSG). It should be noted that, whilst the VQ codebook generated for a particular shot is very specific to that shot, when a cluster contains more than one shot, the updated VQ codebook representing the content of all shots of the cluster is usually less specific than for any particular shot. This means that, for each shot, the best VQ codebook is the one provided before the first merging step. From then on, at subsequent clustering iterations, the shot representation error in the VQ codebook is likely to increase for a given cluster. In FIG. 8, we show how the error is generated after the first merging of clusters $C_2$ and $C_4$ with respect to the OSG.

The error resulting from representing a shot with a new cluster VQ codebook can easily be computed using the VQCDM. After each iteration, the error is given by the sum of the distances between the VQ of cluster R' and the OSG VQs of all shots belonging to R'. In our example, after the first merging step, the error is given by:

$$VQ\_err(first\_step) = VQ\_Dist(C_2, C_2') + VQ\_Dist(C_4, C_2')$$

$$= VQ\_Dist(S_2, C_2') + VQ\_Dist(S_4, C_2')$$

In the general case, the error is given by the following expression, $$VQ\_err(step) = \sum_{S_i \in R'} VQ\_Dist(S_i, R')$$

where R' is the newly formed cluster, and $S_i \in R'$ for all associated shots.

Since we are grouping similar shots into clusters, the VQ codebook for a particular cluster is at risk of losing specificity and accuracy in representing the visual contents of its individual shots with an increase in cluster size. To prevent this degenerative process, after each iteration, statistical analysis is performed on the error generated in the latest merging step, in order to evaluate how generic the new VQ codebook is in representing shots of the cluster, and hence to decide if the merging step is to be retained or invalidated.

For this purpose, at iteration step k, we compute the error change (Delta_VQ_err) introduced, as:

Delta_VQ_err(k)=[VQ_err(k)−VQ_err(k−1)]

In addition, the mean (Mean(Delta_VQ_err)), and standard deviation (Std(Delta_VQ_err)) over previous iterations are computed. Furthermore, all variations of the mean and standard deviation with respect to the previous merging step are also computed as:

Mean(Delta_VQ_err(k))−Mean(Delta_VQ_err(k−1)),

Std(Delta_VQ_err(k))−Std(Delta_VQ_err(k−1)).

Figure 9:
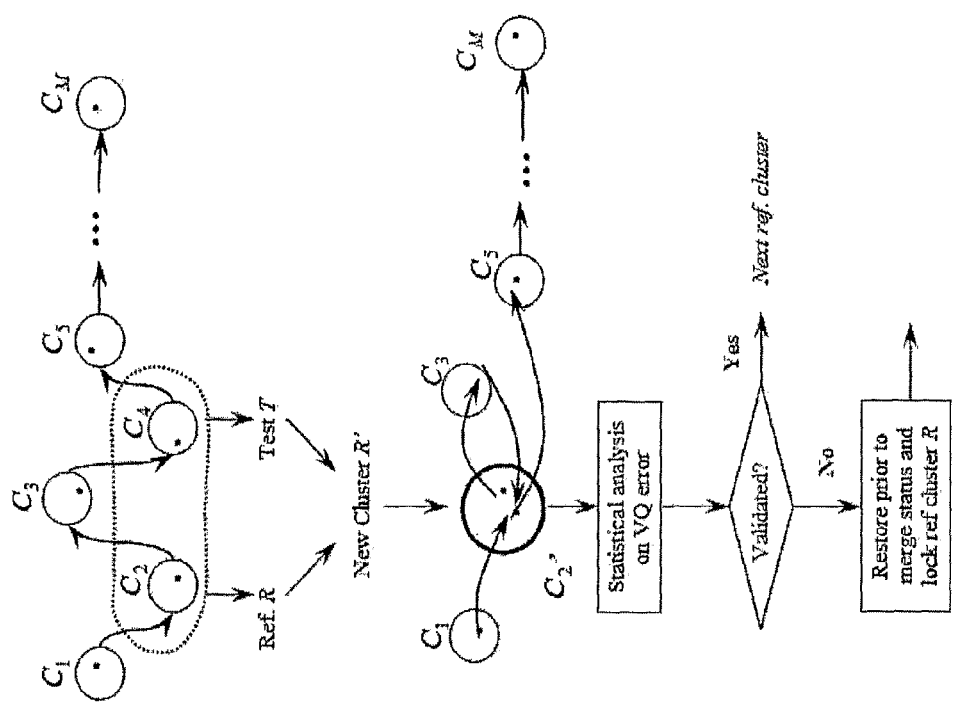
FIG. 9 is a diagram illustrating the validation of a clustering operation.

By then monitoring these values and applying thresholds to one or more of them, it is possible to evaluate whether a newly formed cluster has introduced too much error with respect to the Original Shot Graph, hence invalidating the merging step. This process is indicated in FIG. 9. If this is not the case (i.e. the thresholds are not met) then no action is taken and the next clustering iteration is performed. If this is the case, however, then the previous clustering operation is reversed (i.e. the merged cluster is split into the shots/clusters which existed prior to the clustering operation). Furthermore, the reference cluster is locked out of future clustering processes, and a new reference and test cluster (which are currently classed as unlocked) are selected with the minimal VQCDM for the next clustering iteration. The iteration process is repeated until no more unlocked clusters are available for merging.

Note again that, as the size of the merged cluster increases, visually dissimilar shots are likely to enter the cluster, corrupting even more the representatively of the VQ codebook. Whilst the analysis and subsequent un-clustering operations described above can be used to prevent such a degenerative process, it is also useful to lock a cluster when its size exceeds a certain threshold, e.g. 12-15 shots. Further cluster locking criteria may also be used.

Time-Constrained Analysis

The time-unconstrained analysis approach described above is very useful for many types of video programme, such as movies, since it groups shots into the same cluster based only on the visual contents of the shots and without considering the timing of the context. This approach doesn't set a priori time limit for a scene duration (which is a problem in [2], for instance) and, furthermore, can be useful for certain retrieval purposes, such as user defined-queries such as searching for repeats. For example, when watching the film "Notting Hill" a viewer may wish to see all the scenes set around the 'bookshop' in the order in which they appear. This is straightforward if all similar shots are grouped in the same cluster, which is possible with the time-unconstrained approach.

However, in order to separate one logical story unit from another, further analysis is necessary to take into account the temporal locality of shots grouped in each cluster. In other words, time-constrained analysis should be performed on every cluster. The aim of time-constrained analysis is to split a cluster into one or more temporally-consistent sub-clusters (see FIG. 10) according to a temporal locality criterion.

The time-constrained splitting criterion is as follows:

$$\forall x_h \in C_{i,j} \exists x_k \in C_{i,j} : |h-k| \leq TW$$

where TW is a time window denoting the duration (in terms of number of shots) of a user-selected time window, $C_i$ is the ith cluster, $C_{i,j}$ is one temporally-local sub cluster of $C_i$, and $x_1$, $x_2, \ldots, x_n$ are the shots belonging to $C_{i,j}$. In simple terms, each pair of shots falling within the time window TW as it is moved along the timeline belongs to the same cluster. When only one shot falls within TW, there is a split at the end of TW. Referring to FIG. 10, it will be seen that as TW moves from left to right, there is established a cluster including S1 and S3 followed by S5. As indicated, there is a point where TW includes only S5 and so a split is made at the end of TW. The first sub-cluster is labelled $C_{i1,0}$. A new TW starts and, in the same way, shots S9, S10 (not shown in the timeline) and S11 are grouped together in a new cluster $C_{i,1}$.

Obviously, if all shots are contained in the same time-window TW, the cluster itself becomes a temporally local sub-cluster. This condition can be applied to the shots in each cluster to split the cluster into one or more temporally local sub-clusters, dependent on the scenes represented by the shots contained therein. Transition information indicating the temporal flow between sub-clusters is retained at each sub-clustering operation, such that a directed graph comprising a number of temporally local sub-clusters, as well as the transitions/edges between sub-clusters, is obtained. Each sub-cluster contains visually similar and temporally adjacent shots, and each transition represents the time evolution of the story-line. As mentioned previously, an example of this splitting of clusters into temporally local sub-clusters is indicated in FIG. 10, and an example of the directed graph thus obtained is shown in FIG. 11. In the next stage 19, the directed graph will be subjected to Scene Transition Graph (STG) analysis to automatically extract its structure to account for the semantic structure and time flow of its underlying video programme.

Scene Transition Graphs (STGs)

As described previously, a logical story unit (LSU) is regarded as a sequential collection of interrelated shots unified by common semantic visual content. Given the output from the preceding visual similarity and temporal analysis steps, in this section we show how the STG concept, originally proposed in [16], can be efficiently used to find edges of LSUs, providing a compact representation of the story structure in the video programme.

As already mentioned, the output from the previous processing step is a so-called directed graph comprising a number of nodes and transitions/edges between nodes. Each node may contain some visually similar and temporally adjacent shots, and each transition represents the time evolution of the story-line. In the following description, we first outline the idea of STGs, and thereafter discuss how to extract the structure of the STG automatically without a priori knowledge of the semantic structure and time flow of the video programme.

The definition of a STG is as follows—a directed graph G where G=(V,E,F), in which V={$V_i$} is the node set, E is the edge (or transition) set, and F the mapping that partitions the set of shots $\{S_i\}$ into nodes $V_1, V_2, \ldots$ etc which are members of V. Shots in each $V_i$ are clustered as before using visual VQCDM and time-constrained analysis. This means that each $V_i$ is a temporally-local sub-cluster.

Given a pair of nodes, $(U,W) \in V$, the edge/transition $(U \to W)$ is a member of E if there exists $S_1 \in U$ and $S_m \in W$ such that $m = l+1$. This means that $(U \to W)$ is a member of E if there exists a shot, represented by node U, that immediately precedes a shot represented by node W. An example situation would be a dialogue between two characters, with camera shots alternating between them. In this case, the graph G consists of two nodes $V_1$ and $V_2$ and the directed edges $(V_1 \to V_2)$ and $(V_2 \to V_1)$ are members of E. Herein, we associate with each directed graph G an undirected graph $G'=(V, E')$. G and G' have the same node set, and for each edge $e \in G$ there is a corresponding edge $e \in G'$ with the same ends. Given these preliminary definitions, it is then possible to use an STG to detect LSUs, as will be described next.

STG Cut-Edges for LSU Detection

One important type of transition between two nodes is called a "cut edge". In an undirected graph, a transition is considered a "cut edge", if, when removed, the graph results in two disconnected graphs. The set of cut edges in G' partitions G' into n disjointed sub-graphs $G_1', G_2', \ldots, G_n'$, where each $G_i'=(V_i, E_i')$. Moreover, the cut edges correspondingly induce the same partition on G such that there are n disjoint STGs, $G_1, G_2, \ldots, G_n$, where $G_i=(V_i, E_i, F)$. The mapping F from G is preserved in each $G_i$ after the partitioning of graph G. We can therefore refer to the directed edge e as a cut edge in G if the corresponding edge $e \in G'$ is a cut edge of G'.

As shown in FIG. 11, each connected sub-graph, following removal of cut-edges, will represent a LSU while the collection of all cut edges of the STG represents all the transitions from one LSU to the next, thus reflecting the natural evolution of the video flow and allowing hierarchical organisation of the story structure. By using the directed graph output from the time-constrained analysis as a STG and detecting cut edges therein, LSUs, and transitions therebetween, can be detected in the video sequence. These LSUs (or scenes) semantically represent the video sequence at a higher level than shots, and have a number of uses, as discussed previously.

Audio Signal Processing

The steps involved in processing audio information, which steps may be performed in parallel to the above-described video processing steps, will now be described with particular reference to FIGS. 12 to 17.

Current approaches to semantic video analysis focus more on visual cues than associated audio cues. There is, however, a significant amount of information contained in audio data, which can often be more important than, or complementary to, the visual part. In many video programmes, such as feature films for instance, the director often employs creative montage techniques in which a succession of short but visually different shots share the same audio characteristics (usually a musical melody). In this sense, therefore, the shots belong to the same semantic theme. In such cases, it is contended that the audio cues actually play a primary role in parsing and segmenting the video data.

In general, the combination of both audio and visual data should provide more reliable and accurate scene analysis results.

Within embodiments of the invention described herein, we provide two separate visual and audio data processing chains/branches and produce therefrom separate visual and audio analysis results which are then combined heuristically (as described later) to provide a more logical and hierarchical description of the programme structure. In general, audio data is considered to play a supporting role in relation to visual processing results, the visual part remaining the main reference for detecting real scene changes. In some situations, however, the audio segmentation may be more important. In this case, the video segmentation supports the audio segmentation. In the following text, we describe the use of a set of low-level audio features and a temporal segmentation method to characterise the semantic contents of audio data.

Starting with the segmented audio shots, which may be taken to have the length of corresponding visual shots generated in the initial step 1, audio scene changes can be identified according to a distance measure between two consecutive shots. For each audio shot, we compute a 'signature' (derived from a VQ codebook in a similar manner to the method described previously with respect to the visual signatures) based on spectral features. In this case, the spectral features are provided in the form of Mel-Frequency Cepstrum Coefficients (MFCCs). Then, a distance measure, known as the Earth Mover's Distance (EMD), is adopted to compute the distance between the audio shots, or, rather, their signatures. Finally, a simple thresholding method is used to detect audio scene changes and separate coherent segments of audio data.

Figure 13:
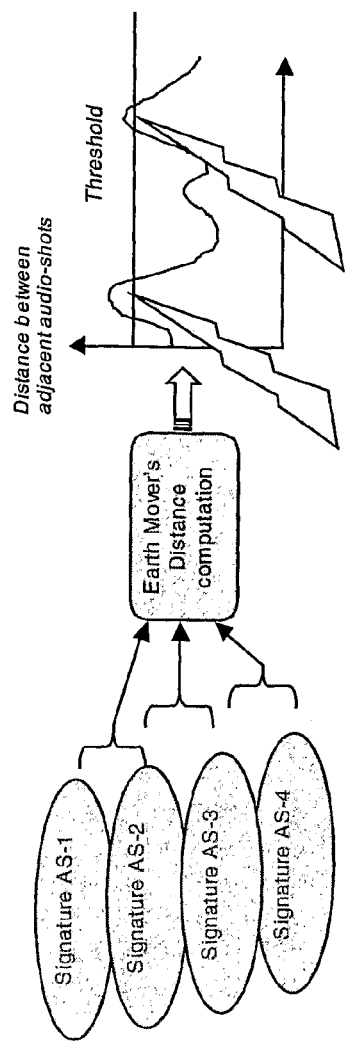
FIG. 13 is a diagram illustrating the use of an Earth Mover's Distance (EMD) calculation.
Figure 12:
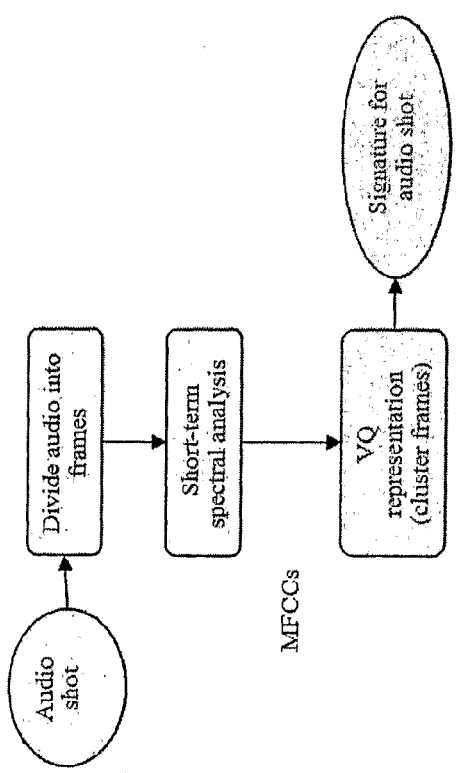
FIG. 12 is a flow diagram illustrating processing undertaken on audio data.
Figure 15:
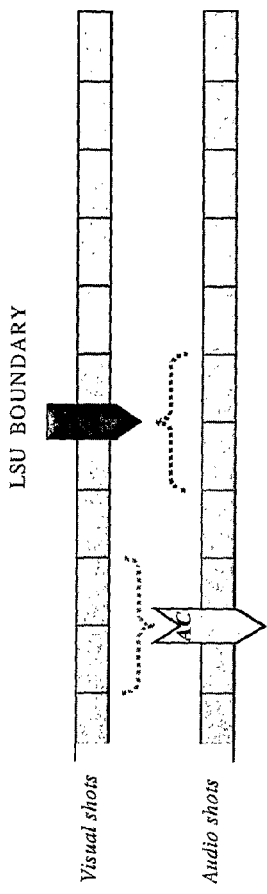
FIG. 15 is a diagram illustrating a first scenario for the integration of audio and video scene boundaries.

FIGS. 12 and 13 respectively represent the step of audio shot signature extraction, and the distance computation of consecutive audio shots for audio scene change detection. Further explanation of each stage is given below.

Audio Shot Data Preparation

As mentioned above, the audio stream is first split into arbitrary segments. In the present embodiment, we split the audio stream into segments which correspond to the already-segmented video shots. Due to gradual transition effects (such as fades and dissolves) which may occur in a video sequence, some of the video shots may be very short in time. In order to avoid problems associated with this effect, if a shot is less than certain duration (e.g. 2 seconds) it is merged with its preceding shot prior to being processed. In this way, we attempt to avoid analysing short silent shots and ensure that analysis is only performed on segments comprising relatively significant amounts of audio information.

The advantage of treating audio data in terms of corresponding video shot segments is that the combination of results from audio and visual data analysis is made more straightforward. Moreover, in the audio processing part, there is no need to focus on the audio data content, but rather on the changes in the feature set values. In this respect, the processing objective is not for the purpose of classification (i.e. to decide whether the audio is music, speech, silence, noise, etc.), but to identify variations in audio characteristics that may correspond either to a scene change or an important event in the story evolution underlined by a significant change in the audio properties.

Short-Term Spectrum Analysis

Having split the audio stream into shot-based segments, in the next step 9, short term spectral analysis is performed on each audio shot to generate feature vectors characterising the shot. This is achieved by first dividing the audio shot into audio frames, each being locally stationary and lasting for a few tens of milliseconds. Then, for each audio frame we conduct spectral analysis, involving the extraction of 19 Mel Frequency Cepstral Coefficients (MFCCS) plus a sound energy component. As will be understood by those skilled in the art, MFCCs are widely used in speech recognition applications and are also used in modelling music [10].

In our embodiments, the audio data is preferably sampled at 22.050 kHz, each sample being represented by 16 bits. The samples are then divided into audio frames of 20 ms long and weighted by a Hamming window; the sliding window is overlapped by 10 ms, so that an output feature vector, or the set of 19 MFCCs, is obtained every 10 ms.

Vector Quantisation of Audio Shots

The MFCCs thus obtained are, in the subsequent step 11, used to derive a signature for each audio shot. To derive a signature for each audio shot, we use the same vector quantisation technique previously described in relation to visual data analysis.

More particularly, after spectral analysis, an entire audio shot is represented by a sequence of 19-dimensional real vectors (MFCCs) representing a 10 ms audio frame of the shot. So, for example, if an audio shot lasts for 2.3 seconds, there will be 230 vectors available for the codebook generation process. Note that since an audio frame with high energy has more influence on the human ear, when we compute frame level features, weighted versions of these MFCCs are used. The weighting factor is proportional to the energy of the frame. This process is especially useful when there are many silent frames in a shot, because the frequency features in silent frames are approximately random. By using energy-based weighting, detrimental effects are removed. The relative weight of each audio frame is obtained using the ratio of the frame energy value and the value of the most energetic one-second clip computed over the audio file (with clip overlapping by 99%).

Once the codebook dimension K is selected, the algorithm for VQ codebook generation starts by randomly positioning K seeds (which will form the centres of the clusters) into a 19-dimension hypercube that contains all spectral audio frames. Each frame is positioned in the hypercube according to its spectral coordinates (i.e. its MFCCs values). The VQ structure is defined by the final position of the gravity centres of its cells, the centroids, which are directly related to the statistical density of features describing the content of the audio shots.

Measuring Distance Between Audio Shot Signatures

The codebook generated for each audio shot thus contains C codewords, each having D dimensions. This VQ codebook becomes the 'signature' of the audio shot to which it relates, the codebook comprising the following information.

i) The C codewords, which are, respectively, the centroid of each cluster in the final codebook, obtained with the formula:

$$(\mu_1, \ldots, \mu_D)_c = \frac{\sum_{i=1}^{M_c} (f_1^i, \ldots, f_D^i)_c}{M_c}$$

where $M_c$ is the number of audio frames in the shot associated with the codeword c, and $f_d^i$ is the $d^{th}$ MFCC of the audio frame i;

ii) Variances of the codewords, obtained with the formula:

$$(\sigma_1^2, \ldots, \sigma_D^2)_c = \frac{\sum_{i=1}^{M_c} [(\mu_1 - f_1^i)^2, \ldots, (\mu_D - f_D^i)^2]_c}{M_c}$$

iii) Weights of the codewords, which account for the number of audio frames $M_c$ associated with each codeword c. Usually, a normalised weight between 0 and 1 is used, i.e.

$$\varpi_c = M_c \bigg/ \sum_{c=1}^{C} M_c$$

Note that any codewords with no audio frames associated are insignificant. Also, if there is only one frame associated to a codeword, then its corresponding cluster will have zero variance and infinite distance from every other codeword according to the distance metric discussed below. So these codewords are discarded.

Earth Mover's Distance (EMD)

Once the characteristic signature, or VQ codebook, for each audio shot is obtained, we use the known Earth Mover's Distance (EMD) to measure the dissimilarity between any two audio shots. This distance metric is described by Rubner, Tomasi and Guibas in "The Earth Mover's Distance as a Metric for Image Retrival", Technical Report STAN-CS-TN-98-86, CS Department, Stanford University, September 1998 as a metric for improved content-based image retrieval from a large image database, and in [10] to compare songs in an audio database for automatic creation of audio play-lists. Computer-based implementation details can be found in [18] and [19].

To summarise, the EMD is a method to evaluate dissimilarity between two signatures. Intuitively, given two signatures, one signature can be seen as a mass of earth properly spread in space, and the other a collection of holes in that same space. The EMD provides a measure of the least amount of work needed to fill the holes with earth. Here, a unit of work corresponds to transporting a unit of earth by a unit of ground distance.

The EMD is applied between each pair of consecutive audio shots to determine the distance therebetween, and the results stored for use in the next stage. Calculation of the EMD between audio shots is represented in FIG. 13. It will be seen that a graphical representation of EMD values can be plotted in relation to the temporal axis. This is referred to as an audio shot distance curve.

Segmentation Procedure for Audio Scene Detection

Having calculated the EMD values between consecutive pairs of audio shots, the resulting distance measures are then used to segment the audio stream into scenes. The objective here is to detect the boundaries of spatially similar (in the sense of spectral properties) and temporally adjacent audio shots in order to identify possible audio scene changes.

In general, an audio scene change is likely to occur when the majority of dominant audio features in the sound change [9]. This can happen just before (or just after) a new visual scene begins. However, this can also indicate an important event in the story, even in the middle of a scene. For example, the dominant audio features in the sound may change to indicate a kiss between two main characters, or to raise suspense before something thrilling happens.

Figure 14:
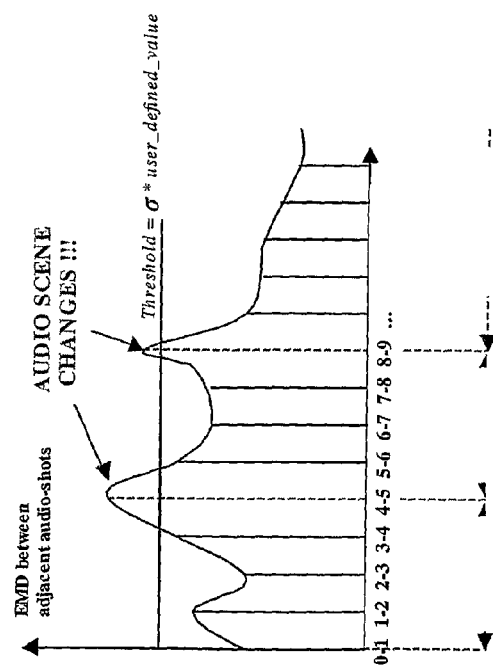
FIG. 14 is a graph of a plot of EMD illustrating the detection of audio scene changes.

Since the EMD provides a distance metric between the signatures of two adjacent audio shots, we can in general say that if the EMD is large, the two consecutive audio shots are quite different in terms of their underlying properties relating to the defined set of low-level description features, or signature. On the contrary, if the EMD value is small, the audio does not change appreciably between the two adjacent shots. In step 13 (see FIG. 1(*a*)) a statistical analysis is be performed to calculate the mean $\mu$ and standard deviation $\sigma$ of all pairs of consecutive audio shot distances. An empirically chosen threshold value multiplied by the standard deviation $\sigma$ is then used to detect peaks in the audio shot distance curve and to partition the audio shots into different segments, as shown in FIG. 14. Thus, by analysing the peaks in the EMD results, audio scene changes can be detected, and an audio scene segmentation obtained.

Audio-Assisted Video Scene Hierarchical Segmentation

The final stage 23 in the present embodiment is arranged to integrate the segmented audio scene information with the segmented video scene information.

The importance of audio in video segmentation has been recognised by many researchers, and recently in reference [20], although the combined use of visual and audio analysis results remains a challenging issue. Here, we describe how audio and visual analysis results, respectively derived from previous shot-based analyses, can be combined to achieve a final high-level description of the video structure.

In contrast to many methods [7] that use audio cues to remove falsely-detected scene boundaries from visual analysis alone, here we first segment the video stream into visual and audio shots (described in previous sections), and then, following the various processing and analysis steps performed in the separate branches, we combine both sets of results to derive the final scene boundaries. The shot-based analysis approach, both for audio and visual processing, avoids many alignment problems that affect some solutions in the art which propose joint audio-visual analysis, and provides a simple method for synchronising results.

In the following, we propose heuristic rules to guide how the audio-visual analysis results are combined. Basically, for each visual scene change detected, the most likely audio scene change is searched for in the neighbouring shots of the shot associated with said visual change. Likewise, for each audio scene change detected, the most likely video scene change is searched for in the neighbouring shots of the shot associated with said audio change. As we usually treat visual output as the main reference for detecting real scene changes, the audio output is used to support, or complement, the visual processing results. We are then able to assign different hierarchical meanings to different types of visual-audio boundary combinations.

Rules for Audio-Video Result Combination

We identify three possible scene segmentation boundary situations, described as follows.

i) A video scene boundary is detected, but no audio scene boundary exists with the same time-stamp.

This is quite a common situation in which the story changes location and/or time, but the audio line doesn't actually change. This is the case when, for example, during a 'speech' situation, the visual scene changes but the underlying audio scene still remains 'speech'. Sometimes this can also happen when a sequence of audio shots have the same underlying semantic meaning. For example, there may be provided a series of different video shots accompanied by the same song or audio track, such as in the case of a rapid description of an event of long duration (e.g. a journey), or to describe a particular sequence of events happening in sequence but sharing a well-defined semantic meaning, such as for example the passing of seasons.

ii) An audio scene boundary is detected, but no video scene boundary exists at the same time-stamp.

This often happens when the authors want to underline an important moment in the sequence or, more simply, when the mood of the scene changes to a sad/happy/romantic/thrilling/scary moment. In the "Notting Hill" film, for example, there is an audio scene change in the middle of the scene when, in a museum location, a marriage proposal is made to Julia Roberts' character.

iii) A video scene boundary is detected, and an audio scene boundary exists at the same time-stamp:

This is the simplest case to detect, given that the audio and visual features change at the same time. It may be that the audio change just anticipates (as an introduction) or just follows a corresponding visual scene change. These situations are taken into account when defining the rules to be used. As stated before, it is not always true that detected scene boundaries correspond to the actual start and/or ending of a scene, and that is one of the reasons why LSUs are considered the best approximation to real movie episodes. In this case, however, since both audio and visual features are changing at the same time we can be relatively certain that the detected LSU boundary is also a real scene break.

Having presented the different scene boundary scenarios, we now define a plurality of rules with a view to discovering proper structures in the story-lines.

In the following description, we use $VC(s_i)$ and $AC(s_i)$ to denote, respectively, a Visual Change and an Audio Change taking place at shot i.

Logical Story Unit (LSU) Boundary

If a visual change happens but no audio change is detected, this can be regarded as an 'LSU boundary' according to the definition described above, since the sequence of shots share similar visual content on either side of the shot.

Rule i)

An LSU boundary is detected at shot i if and only if:

$$\exists VC(s_i) AND (NOT((AC(s_{i-N})) OR (AC(s_{i-N+1})) OR \ldots OR (AC(s_{i+N-1})) OR (AC(s_{i+N}))))$$

where N is a temporal ambiguity window around each VC. N is one shot in the example shown in FIG. 15.

Audio Pattern Hints Inside an LSU

If an audio change happens but is not followed by a visual change, from the definition of LSU, we cannot state anything about an eventual scene break. However, we do know that, for some reason, the audio has changed with respect to the previous shot—possibly underlining an important event which is taking place, a change in the mood in a movie, or a romantic moment. For this reason, and because our technique relies mainly on visual analysis for detecting scene changes, we refer to these audio changes as 'audio pattern hints' that the video programme creator intended to be significant for the evolution of the storyline.

Rule ii)

Figure 16:
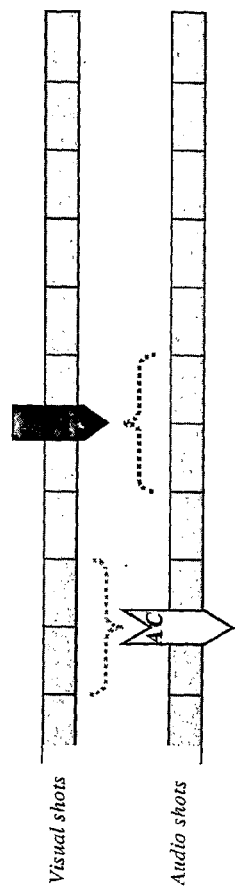
FIG. 16 is a diagram illustrating a second scenario for the integration of audio and video scene boundaries.

Therefore, an audio pattern hint is detected at shot i if and only if:

$$\exists AC(s_i) AND (NOT((VC(s_{i-N})) OR (VC(s_{i-N+1})) OR \ldots OR (VC(s_{i+N-1})) OR (VC(s_{i+N}))))$$

where N is a temporal ambiguity window around each AC and has, in this example, a value of one shot. This situation is shown in FIG. 16.

Audio-Visual Scene Change

If an audio change occurring at shot i coincides with a visual change on or around that shot, we detect an 'audio-visual scene change,'. In this case, it is very likely that the detected LSU boundary is a real scene break. The ambiguity window of length N takes into account the case of an audio change anticipating (occurring just before) or following (occurring just after) a visual scene change. As a result, the third rule is defined as follows.

Rule iii)

Figure 17:
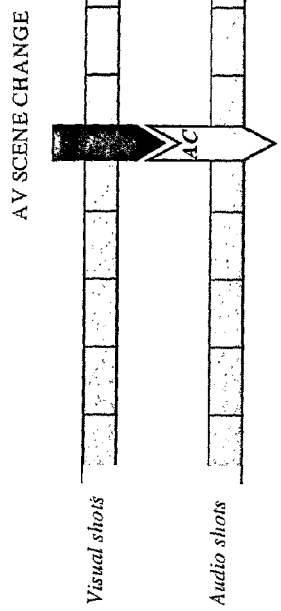
FIG. 17 is a diagram illustrating a third scenario for the integration of audio and video scene boundaries.

An audio-visual scene change is detected at shot i if and only if:

$$\exists VC(s_i) AND ((VC(s_{i-N})) OR (VC(s_{i-N+1})) OR \ldots OR (VC(s_{i+N-1})) OR (VC(s_{i+N})))$$

where N is a temporal ambiguity window around each VC, with, in this case, N having a value of one shot. This situation is represented in FIG. 17.

With these types of semantic content information, which include audio-visual scene changes, new LSUs, and audio hints inside the LSUs, it is possible to build a more precise hierarchical organisation of the story-line structure, taking one step further into the automatic semantic understanding of video media.

Example embodiments of the invention may find many different industrial applications. It is envisaged that example embodiments of the invention is primarily, although not exclusively, implemented by way of a software program running on a processor, although dedicated hardware implementations can also be equally envisaged. As an example of one application, a personal computer, DVD recorder, or other audio-visual equipment capable of reproducing an audio-visual sequence could be provided with software arranged to embody example embodiments of the invention when executed. Execution of the software is performed under the control of the user, for example by the user pressing a "Find Similar" control button on a remote control for the DVD or the like. During playback of an audio video sequence the user presses the "Find Similar" button at a scene for which he wishes the DVD player to search the entire sequence to find semantically similar scenes. The DVD player then executes the software embodying example embodiments of the present invention up to the stage that time-unconstrained clustering is performed, and then displays to the user all of the found scenes which are in the same cluster as the scene which the user was viewing when he activated the "Find Similar" function. In this way the user is able to view all of the semantically similar scenes in an audio-video sequence at the touch of a button.

In another application, example embodiments of the invention may be used to automatically generate chapter markers relating to audio scene changes, video scene changes, and logical story unit boundaries. Once again, a device such as a personal computer, DVD recorder, or other audio-visual equipment capable of reproducing an audio-visual sequence could be provided with software arranged to embody example embodiments of the invention when executed. The user loads an audio-visual sequence (which could be stored on a DVD disc, downloaded from the interne, or otherwise input) into the device and then commands the device to execute the software embodying example embodiments of the invention (for example by pressing a suitable button or controlling the device using a graphical user interface). The software then operates to determine video and audio scene boundaries, and logical story unit boundaries as described, and markers relating to the different types of boundary can be stored within the content or in an index thereto. Having generated such markers the user can then navigate through the audio visual content using the markers. The different types of markers provide for different types of navigation, and hence the user experience of the content is enriched.

Other applications of example embodiments of the invention will be readily apparent to the intended readers.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Moreover, for the avoidance of doubt, where reference has been given to a prior art document or disclosure, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

SUMMARY

To summarise the above, the preferred embodiment provides a technique for deriving content information at the semantic level so as to provide meaningful information relating to the content of a video sequence, such as a film or television programme. The technique initially divides the video sequence into individual shots. An accompanying audio sequence may also be divided into audio shots on the basis of the shot-based video division. Following this, a two branch analysis stage is employed to respectively process the video and audio shots. In the video analysis branch, a representative keyframe is provided for each shot. The keyframe is divided into pixel blocks which constitute training vectors for a VQ codebook learning process, the codebook thereafter characterising the keyframe, and so the shot. A known distance metric is employed to compute the distance (indicative of the visual similarity) between each pair of codebooks (shots), following which clustering is performed by grouping together shots whose inter-shot distance falls within a predetermined range. Next, time-constrained clustering is performed in which the temporal locality of shots grouped in a common cluster is taken into account. The resulting sub-clusters are representative of video shots having visually similar and temporally-adjacent content. A number of steps are then employed to identify logical story units (LSUs) from the sub-clusters.

In the audio branch, short-term spectrum analysis can be performed on each audio shot to derive a set of Mel Frequency Cepstrum Components (MFCCs) which form the training vectors to a further VQ codebook learning process. An Earth-Mover's Distance (EMD) measure can be used to compute the distance (indicative of the audio similarity) between each pair of audio codebooks, from which audio shot boundaries can be located by identifying peaks in the EMD measure along the sequence timeline.

Finally, a set of heuristic rules may be applied to the resulting LSUs and audio shot scenes to identify information relating to the audio-video sequence at the semantic level. This uses a comparison between respective boundary edges of the LSUs and the audio shot scenes.

REFERENCES

1. A. Hanjalic, "Visual-Content Analysis for Multimedia Retrieval Systems", PhD Thesis, Delft University of Technology, The Netherlands, 1999.
2. M. M. Yeung and B. L. Yeo, "Time-constrained clustering for segmentation of video into story units," *Proceedings of ICPR'96*.
3. A. Hanjalic, R. L. Lagendijk, "Automated high-level movie segmentation for advanced video retrieval systems," *IEEE Trans. on Circuits and Systems for Video Technology*, 9(4), June 1999.
4. B. Adams, "Where does computational media aesthetics fit?" *IEEE Multimedia*, April-June 2003, pp. 18-26.
5. Z. Liu, Y. Wang and T. Chen, "Audio feature extraction and analysis for scene segmentation and classification", Vol. 20, No. 1, *Journal of VLSI Signal Processing Systems for Signal, Image, and Video Technology*, 6. H. Sundaram and S. F. Chang, "Determining computable scenes in films and their structures using audio-visual memory models," *ACM Multimedia* 2000, pp. 95-104.
7. Y. Chao, W. Tavanapon, K. Kim, and J. Oh, "Audio-assisted scene segmentation for story browsing," *Proc. of Int'l Conf. on Image and Video Retrieval* (CIVR'03), pp. 446-455, Urbana-Champaign, Ill., USA, July 2003.
8. S.-C. Chen, M.-L. Shyu, W. Liao, and C. Zhang, "Scene change detection by audio and video clues," *Proc. of IEEE ICME'2002*, pp. 365-368, 2002, Lausanne, Switzerland.
9. H. Sundaram and S. F. Chang, "Audio scene segmentation using multiple features, models and time scales," *Proc. of ICASSP'2000*, Istanbul, Turkey, June 2000.
10. B. Logan, A. Salomon, "A content-based music similarity function," *Compaq Technical Report* (CRL-2001-2), June 2001.
11. Y. Rubner, C. Tomasi, and L. Guibas, "The Earth Mover's Distance as a metric for image retrieval," *Technical Report STAN-CS-TN-98-86*, CS Department, Stanford University, September 1998.
12. J. G. R. C. Gomes, M. Carli, S. K. Mitra and A. Neri, "Vector quantization-based automatic shot boundary detection," *Proc. of IEEE Workshop on Multimedia Signal Processing* (MMSP'02), pp. 216-219, 2002.
13. http://www.aber.ac.uk/media/Documents/short/gramtv.html
14. http://www.alphaworks.ibm.com/tech/videoannex
15. B. L. Yeo and B. Liu, "Rapid scene analysis on compressed videos," *IEEE Trans. on C.S.V.T.*, December 1995.
16. M. M. Yeung, B. Yeo, W. Wolf, B. Liu, "Video browsing using clustering and scene transitions on compressed sequences," in *Proc. of Multimedia Computing and Networking*, Vol. SPIE 2417, pp. 399-413, February 1995.
17. A. Gersho, R. M. Gray, "Vector Quantization and Signal Compression", Kluwer Academic Publishers, January 1992.
18. F. Archetti, E. Fagioli e a. Scimachen, "Metodi della ricerca operativa," Giappichelli 1989.
19. W, H. Press, B. P. Flannery, S. A. Teukolsky, and W. T. Vetterling, "Numerical Recipes in C", Cambridge Univ. Press, 1988.
20. Y. Wang, Z. Liu, J.-C. Huang, "Multimedia content analysis using both audio and visual cues," *IEEE Signal Processing Magazine*, 2001.

The invention claimed is:

1. A method of identifying semantically similar shots in a video sequence, comprising the steps of:—
   a) identifying shots within the video sequence, each shot being a temporally consecutive sequence of video frames;
   b) calculating distance values between each shot and every other shot; and
   c) clustering shots into groups in dependence on the respective calculated distance values therebetween; wherein the calculating step comprises:—
      i) generating a codebook representation of each identified shot expressing at least a keyframe of each shot as a plurality of codes;
      ii) calculating the distance values between each shot and each other shot in dependence on the respective codebook representations thereof; and
   the clustering step comprises iteratively performing the steps of
      i) selecting a first shot or cluster of shots and a second shot or cluster of shots which have a low distance therebetween,
      (ii) clustering the selected shots or cluster of shots into a new cluster,
      (iii) for the new cluster, generating a new codebook representation using at least the keyframes of each of the first and second shots or clusters which form the new cluster, and calculating the distance values between the codebook(s) for the remaining shots or clusters and the new codebook for the new single cluster,
      (iv) generating an error value for the new single cluster based on the sum of distances between the new codebook and the codebooks previously determined for the first and second shots or clusters forming the new cluster, and
      (v) in dependence on the error value, invalidating the new cluster and retaining the selected shots or clusters of shots.

2. A method according to claim 1, wherein the generating step comprises:—
   i) dividing the frame into blocks of x by y pixels;
   ii) arranging, in a chosen colour space, the respective pixel values $(p_i, \ldots, p_D)$ of each block into a feature vector; and
   iii) identifying clusters of feature vectors from which the codebook representation can be generated.

3. A method according to claim 2, wherein the generated codebook representation comprises:
   i) C codewords, which are, respectively, the centroid of each cluster of feature vectors, obtained as follows:

$$(\mu_1, \ldots, \mu_D)_c = \frac{\sum_{i=1}^{M_c}(p_1^i, \ldots, p_D^i)_c}{M_c}$$

where $M_c$ is the number of x by y blocks falling within the partition of the codeword c
   ii) variances of the codewords, obtained with the formula:

$$(\sigma_1^2, \ldots, \sigma_D^2)_c = \frac{\sum_{i=1}^{M_c}[(\mu_1 - p_1^i)^2, \ldots, (\mu_D - p_D^i)^2]_c}{M_c}; \text{ and}$$

iii) Weights of the codewords, which account for the number of x by y blocks $M_c$ associated with each codeword c.

4. A method according to claim 3, wherein a normalised weight between 0 and 1 is used, an computed as $$\varpi_c = M_c \bigg/ \sum_{c=1}^{C} M_c.$$

5. A method according to claim 3, wherein the calculations of a distance value between any two shots comprises the steps:—
   i) comparing each codebook vector $y_i \in \{y_1, \ldots, y_N\}$ of a first shot (A) with that of a second shot (B) $z_j \in \{z_1, \ldots, z_N\}$ to compute a distance matrix $d_{i,j} = d(y_i, z_j)$ according to:

$$d_{i,j} = \frac{1}{D} \sum_{h=0}^{D} [\alpha(\mu_{i_h} - \mu_{j_h})^2 + (1-\alpha)(\sigma_{i_h} - \sigma_{j_h})^2],$$

for $i = 1, \ldots, N$ and $j = 1, \ldots, N$ where D is the dimension of codebook vectors, and $0<\alpha<1.0$ is a weighting factor;

ii) determining the distance value ($VQ_d(A,B)$) between the two shots (A and B) in accordance with:

$$VQ_d(A, B) = \sum_{i=1}^{N} \left[ \max_j(w_i, w_j) \cdot \min_j(d_{i,j}) \right].$$

6. A method according claim 1, wherein step (c) further comprises (vi) preventing the selected shots or clusters of shots from being selected for clustering in further iterations.

7. A method according to claim 1, wherein step (c) further comprises preventing clusters of shots from being selected for clustering in further iterations if the number of shots in the cluster equals or exceeds a threshold number.

8. A method of identifying semantically similar scenes in a video sequence, comprising:

a method of identifying semantically similar shots according to claim 1; and further comprising the steps:

for each cluster of shots, identifying those shots contained therein which are temporally consecutive; and splitting the cluster into sub-clusters each containing a group of temporally consecutive shots;

wherein each shot in a particular sub-cluster is semantically similar and temporally adjacent to others in the same sub-cluster.

9. A method of identifying logical story units in a video sequence comprising:

a method of identifying semantically similar scenes according to claim 8; and further comprising:

performing a graph analysis on the sub-clusters and temporal transitions defining the temporal flow of the video sequence between sub-clusters of shots to identify groups of sub-clusters within which the temporal flow moves in sequence;

wherein the identified groups of sub-clusters correspond to logical story units of the video sequence.

10. A method according to claim 1, and further comprising:— i) segmenting an accompanying audio soundtrack to the video sequence into segments corresponding to the identified video shots;

ii) calculating distance values between consecutive audio segments; and iii) detecting audio scene boundaries in dependence on the calculated distance values.

11. A method according to claim 10, wherein the calculating step comprises i) generating a codebook representation of each audio segment expressing each segment as a plurality of codes;

ii) calculating the distance values between consecutive segments in dependence on the respective codebook representations thereof.

12. A method according to claim 11, wherein the generating step comprises:— i) dividing each segment into frames;

ii) conducting a spectral analysis of each frame to extract D spectral coefficients, and to determine a frame energy;

iii) normalising the D spectral coefficients in dependence on at least the frame energy;

iv) arranging the respective spectral coefficients ($f_i, \ldots, f_D$) into a feature vector; and v) identifying clusters of feature vectors from which the codebook representation can be generated.

13. A method according to claim 12, wherein the generated codebook representation comprises:

i) C codewords, which are, respectively, the centroid of each identified cluster, obtained with the formula:

$$(\mu_1, \ldots, \mu_D)_c = \frac{\sum_{i=1}^{M_c} (f_1^i, \ldots, f_D^i)_c}{M_c}$$

where $M_c$ is the number of audio frames in the shot associated with the codeword c;

ii) Variances of the codewords, obtained with the formula:

$$(\sigma_1^2, \ldots, \sigma_D^2)_c = \frac{\sum_{i=1}^{M_c} [(\mu_1 - f_1^i)^2, \ldots, (\mu_D - f_D^i)^2]_c}{M_c}$$

iii) Weights of the codewords, which account for the number of audio frames $M_c$ associated with each codeword c.

14. A method according to claim 13, wherein a normalised weight between 0 and 1 is used, given by $$\varpi_c = M_c \Big/ \sum_{c=1}^{C} M_c.$$

15. A method according to claim 10, wherein the distance value calculated between consecutive audio segments is an Earth Mover's Distance value.

16. A method according to claim 10, and further comprising the step of integrating the audio scene boundaries and the video scene boundaries using predefined heuristic criteria.

17. A method according to claim 16, wherein when an audio scene boundary is detected substantially contemporaneously with a video scene boundary, it is determined that an audio-visual boundary has been detected.

18. A method according to claim 16, wherein when a video scene boundary is detected but no audio scene boundary is detected substantially contemporaneously therewith, it is determined that a logical story unit boundary has been detected.

19. A method according to claim 16, wherein when an audio scene boundary is detected but no video scene boundary is detected substantially contemporaneously therewith, it is determined that a semantically significant event within a logical story unit has occurred.

20. A non-transitory computer readable storage medium storing computer program instructions for causing a programmable processor to carry out the method according to claim 1.

21. A system comprising a general purpose processor, the processor being arranged in use to perform the method of claim 1.

* * * * *